(12) United States Patent
Alonso et al.

(10) Patent No.: US 11,797,620 B2
(45) Date of Patent: Oct. 24, 2023

(54) EXPERT DETECTION IN SOCIAL NETWORKS

(71) Applicant: MICROSOFT TECHNOLOGY LICENSING, LLC, Redmond, WA (US)

(72) Inventors: Omar Alonso, Redwood City, CA (US); Martin Hentschel, San Mateo, CA (US); Vasileios Kandylas, Sunnyvale, CA (US); Thibault Sellam, Amsterdam (NL)

(73) Assignee: Microsoft Technology Licensing, LLC, Redmond, WA (US)

( * ) Notice: Subject to any disclaimer, the term of this patent is extended or adjusted under 35 U.S.C. 154(b) by 438 days.

(21) Appl. No.: 17/070,725

(22) Filed: Oct. 14, 2020

(65) Prior Publication Data

US 2021/0026910 A1   Jan. 28, 2021

Related U.S. Application Data

(63) Continuation of application No. 15/054,370, filed on Feb. 26, 2016, now abandoned.

(51) Int. Cl.
*G06F 16/00* (2019.01)
*G06F 16/9535* (2019.01)
(Continued)

(52) U.S. Cl.
CPC .... *G06F 16/9535* (2019.01); *G06F 16/24578* (2019.01); *G06F 16/958* (2019.01);
(Continued)

(58) Field of Classification Search
None
See application file for complete search history.

(56) References Cited

U.S. PATENT DOCUMENTS 9,367,603 B2 * 6/2016 Keng .................. G06Q 50/01
9,483,580 B2 * 11/2016 Franceschini ....... G06F 16/9024
(Continued)

FOREIGN PATENT DOCUMENTS

CN        101395590 A        3/2009
CN        102298612 A        12/2011
(Continued)

OTHER PUBLICATIONS

"Notice of Allowance Issued in Chinese Patent Application No. 201780013556.6", dated Aug. 29, 2022, 4 Pages.
(Continued)

*Primary Examiner* — Debbie M Le
(74) *Attorney, Agent, or Firm* — Shook, Hardy & Bacon L.L.P.

(57) ABSTRACT

Aspects of the technology described herein detect experts in social networks. Experts may be identified within social networks using social network data. A collection of topics may be compiled based on search engine behavioral data. A combination of the social network data and search engine behavioral data is utilized to score each topic within potential topics for a user. When a topic score is over a predetermined threshold, a user may be classified as an expert for that topic. Expert search interfaces may be generated for use in browsing or searching for experts within a topic.

20 Claims, 8 Drawing Sheets

(51) Int. Cl.
  *G06F 16/2457* (2019.01)
  *G06Q 50/00* (2012.01)
  *G06Q 10/0639* (2023.01)
  *G06F 16/958* (2019.01)
  *G06Q 10/06* (2023.01)

(52) U.S. Cl.
  CPC ....... *G06Q 10/06* (2013.01); *G06Q 10/06398* (2013.01); *G06Q 50/01* (2013.01)

(56) References Cited

U.S. PATENT DOCUMENTS

| | | | |
|---|---|---|---|
| 9,607,324 B1* | 3/2017 | Reed | G06Q 30/0282 |
| 10,102,290 B2* | 10/2018 | Spaulding | G06F 16/24578 |
| 10,223,637 B1* | 3/2019 | Czuba | G06N 5/02 |
| 11,526,773 B1* | 12/2022 | Czuba | G06N 20/10 |
| 2013/0018871 A1 | 1/2013 | Mehta et al. | |
| 2013/0246327 A1 | 9/2013 | Tabrizi et al. | |
| 2014/0201216 A1 | 7/2014 | Bryant et al. | |
| 2015/0039603 A1 | 2/2015 | Alonso et al. | |
| 2015/0120713 A1 | 4/2015 | Kim et al. | |
| 2015/0120717 A1* | 4/2015 | Kim | G06F 16/335 707/727 |
| 2016/0117397 A1* | 4/2016 | Bansal | G06F 16/9535 707/723 |
| 2016/0203523 A1* | 7/2016 | Spasojevic | G06Q 30/0269 705/14.66 |
| 2017/0091644 A1* | 3/2017 | Chung | G06Q 10/101 |
| 2017/0249388 A1 | 8/2017 | Alonso et al. | |

FOREIGN PATENT DOCUMENTS

| | | |
|---|---|---|
| CN | 102662956 A | 9/2012 |
| CN | 102855535 A | 1/2013 |
| CN | 102999560 A | 3/2013 |
| CN | 103177075 A | 6/2013 |
| CN | 103309962 A | 9/2013 |
| KR | 20150033768 A | 4/2015 |

OTHER PUBLICATIONS

"First Office Action and Search Report Issued in Chinese Patent Application No. 201780013556.6", dated Jul. 5, 2021, 16 Pages.
"Second Office Action Issued in Chinese Patent Application No. 201780013556.6", dated Dec. 14, 2021, 7 Pages.
"Third Office Action and Search Repod Issued in Chinese Patent Application No. 201780013556.6", dated Jun. 6, 2022, 10 Pages.
Chunying, et al., "Research on an Expert Recommendation Model Based on the Scholar Community SCHOLAT", In Journal of Caai Transactions on Intelligent Systems, vol. 7, No. 4, Aug. 2012, 5 Pages.
Li, et al., "A Service Mode of Expert Finding in Social Network", In Proceedings of International Conference on Service Sciences (ICSS), Apr. 11, 2013, pp. 220-223.
Shi, L.B., "Research on the Recommendation Method of Review Experts Based on Topic Analysis", Jul. 13, 2015, 83 Pages.
Zhang, et al., "Exped Finding in a Social Network", In Proceedings of 12th International Conference on Database Systems for Advanced Applications (DASFAA), Apr. 9, 2007, 4 Pages.

* cited by examiner

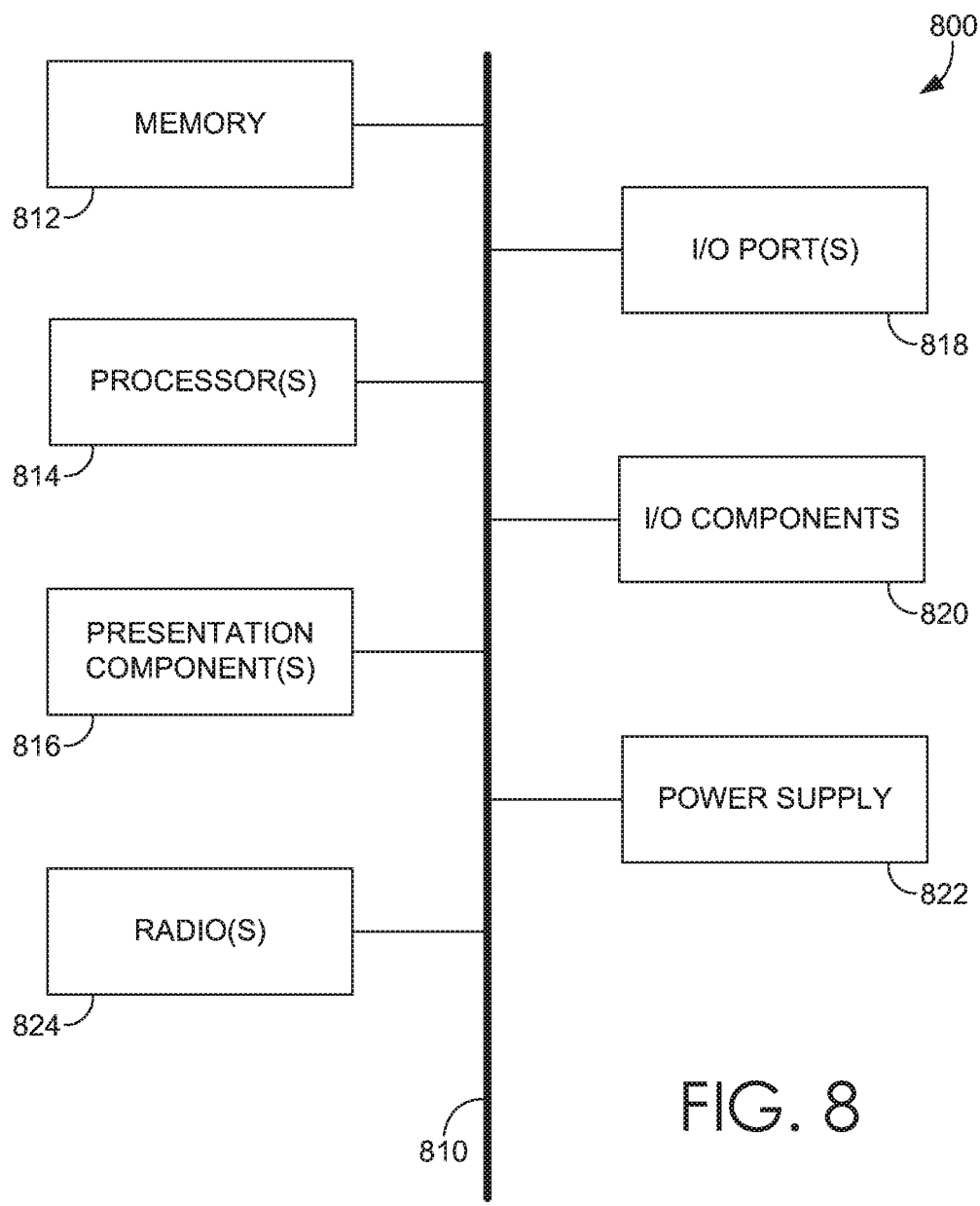

EXPERT DETECTION IN SOCIAL NETWORKS

CROSS-REFERENCE TO RELATED APPLICATIONS

This application is a continuation of application Ser. No. 15/054,370, filed Feb. 26, 2020, entitled Expert Detection in Social Networks, which is incorporated herein in its entirety.

BACKGROUND

People wish to identify experts on topics for various reasons. In today's digital world consisting of large volumes of information available at the click of a button, experts are needed to help navigate through these digital spaces. In addition to the large volume of information to go through, required knowledge is sometimes not freely available (or accessible), it may be lost in a sea of information, or mixed with other relevant potentially unreliable information (e.g., many people talk about knee surgery but all are not trustworthy). Thus, correctly identifying people with relevant expertise on a topic is crucial.

Traditionally, expertise detection focused on finding experts from enterprise documents, in order to smooth collaboration between employees. The corpora were small, heterogeneous and the queries were very specific. With social media, the context is different: the topics of interest can be narrow (e.g., 49ers draft) or broad (e.g., sports). The corpora are homogenous (all messages have the same format), but the scale is massive. Particularly, a large number of users are interacting on a diverse set of topics. Users are looking for information sources, not collaborators. This creates the problem to detect expertise in social media networks with both high recall and high precision.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

The technology described herein allows for expertise detection in social media networks with both high recall and high precision utilizing query expansion using behavioral data, as discussed in detail below. Expertise is detected and users having this expertise are profiled accurately so that users with expertise for a given topic are retrieved. Expert profiling is utilized to identify topics that a person is knowledgeable about and is done by analyzing user's online activity. If accurate profiles are produced, users can be categorized as having expertise (or not) on a set of topics. Profiles may be created that include shared links, activity timelines, associated topics, named-entities and user relationships of a user account within a social network. The technology described herein allows for expertise detection using topical authorities based on short fragments (e.g., tweets, mentions, retweets, etc.) and a number of similarity metrics. The present technology can also classify user account-types into a person-type or a company-type. Also, the present technology may be applicable to any social network structure and should, therefore, work on any software that supports such user structure (e.g., Twitter, Facebook, email, etc.).

BRIEF DESCRIPTION OF THE DRAWINGS

Aspects of the technology are described in detail below with reference to the attached drawing figures, wherein:

FIG. 8 is a block diagram of an exemplary computing environment suitable for implementing aspects of the technology described herein.

DETAILED DESCRIPTION

Figure 1:
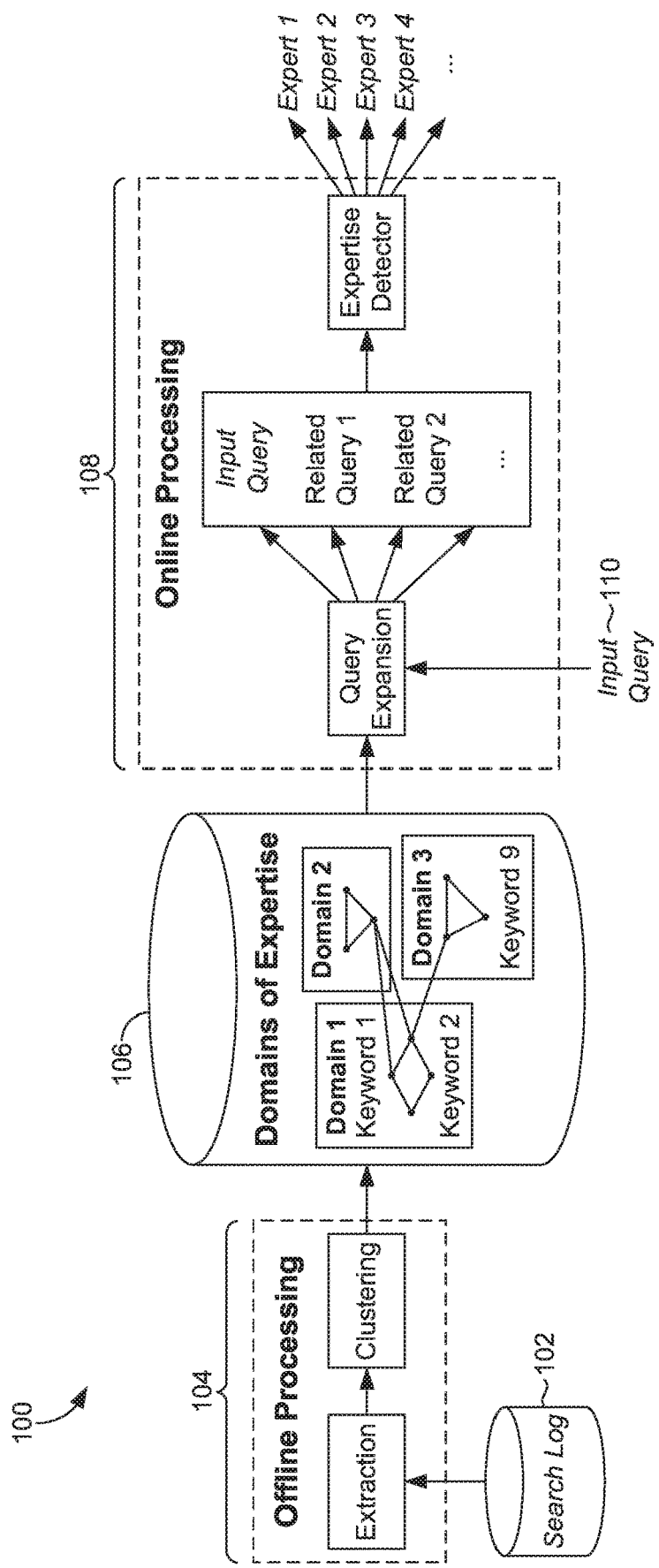
FIG. 1 is a block diagram of an exemplary computing environment suitable for expert detection, in accordance with an aspect of the technology described herein.

The subject matter of the technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The technology described herein allows for expert detection within social media networks (e.g., microblogs) by retrieving experts from microblogs, given a topic expressed as a set of keywords. A microblog, as used herein, refers generally to a social media network where users make short, frequent posts. Exemplary posts include tweets, retweets, mentions, etc. A tweet, as used herein, refers generally to an original post within the social media site Twitter. A retweet, as used herein, refers generally to a post that shares content of a post originating with a different author. A mention, as used herein, refers generally to a post created by one author that references another user different from the author. The other user, referenced in the post, is mentioned. Posts may include additional information such as hashtags, where hashtags refer herein to a word or phrase preceded by a hash mark (#) to identify a keyword or topic.

Expertise detection systems must achieve high precision and high recall. Precision measures the purity of the results. It is the proportion of experts returned by the system which are relevant to the topic. On microblogs, achieving high precision is challenging because the data contains an extravagantly large range of topics and vocabulary: it contains spam, fake accounts, but also many ambiguities. For instance, the simple term "football" designates a different sport in Europe and America. Recall measures the exhaustivity of the results. It is the proportion of relevant experts on the whole microblogging platform detected by the system. Recall is challenging because the content of microblogs is short (e.g., tweets are limited to 140 characters). An expert in "49ers" is likely to be an expert in "NFL" too, because the 49ers are a popular football team from the National Football League. Yet, as the content is limited (character counts, for example), the chance to have both expressions in the same post is low. Therefore, a search for "49ers" may miss the experts for "NFL."

Expertise detection has been studied for decades, as previously mentioned, but in a different context. As previously explained, expertise detection initially focused on finding experts from enterprise documents, in order to smooth collaboration between employees. The corpora were small, heterogeneous, and the queries were very specific. With social media, the context is very different: the topics of interest can be narrow or broad. The corpora are homogeneous but the scale is massive. Particularly, a large number of users are interacting on a diverse set of topics. Also, the requirements in terms of precision and recall are different. In enterprise settings, the aim was to initiate professional collaborations, thus false positives were very costly. In contrast, users of the present discussion are looking for information sources, not collaborators. Hence, they value depth and variety, while false positives are relatively cheap. This shifts the balance towards recall. Unfortunately, achieving high recall is much harder on social media because microposts have a short length and an immense vocabulary.

The technology described herein detects experts with both high recall and high precision using query expansion that uses behavioral data. Query expansion using behavioral data has not been used for expertise detection. The technology described herein operates in two steps: offline and online. Offline, a collection of linked topics of expertise is built from Web data. Online, incoming queries are augmented with this collection and the result is fed to a precision-based expert detector.

FIG. 1 provides an overview of the pipeline utilized in the present technology. Two stages are depicted: an offline processing stage (during which the collection of linked topics is built) illustrated by reference numeral 104 and an online stage (during which the collection of linked topics is used) depicted by reference numeral 108.

The configuration of FIG. 1 may be communicatively coupled to each component via a network. FIG. 1 may be implemented on or using one or more computing devices, such as computing device 800 described in connection with FIG. 8. The network may include, without limitation, one or more local area networks (LANs) and/or wide area networks (WANs). Such networking environments are commonplace in offices, enterprise-wide computer networks, intranets, and the Internet. It should be understood that any number of components and/or devices may be employed within the system 100 within the scope of technology described herein. Each may comprise a single device or multiple devices cooperating in a distributed environment. Additionally, other components not shown may also be included within the environment 100.

Example system may include one or more client devices, which may comprise any type of computing device where inputs and results are generated and/or displayed. For example, in one embodiment, the client devices may be one type of computing device described in relation to FIG. 8 herein. By way of example and not limitation, a user device may be embodied as a personal data assistant (PDA), a mobile device, smartphone, smart watch, smart glasses (or other wearable smart device), augmented reality headset, virtual reality headset, a laptop, a tablet, remote control, entertainment system, vehicle computer system, embedded system controller, appliance, home computer system, security system, consumer electronic device, or other similar electronics device.

Although it is contemplated that aspects of the expert detection model described herein may operate on one or more client devices, it is also contemplated that some embodiments of the technology described herein do not include client devices. For example, an expert detection model may be embodied on a server or in the cloud.

Expert detection involves two main challenges: candidate selection and expertise ranking. Candidate selection is the problem of finding candidate experts for a given topic. Expertise ranking is the problem of determining the strength of expertise given textual evidence. Candidate expert, as used herein, refers generally to an author of content, or a person mentioned in content (such as, for example, a tweet or other social media post) matching a query. By default, content matches a query when it contains all of the terms of the query after lower-casing.

Initially, user profiles are built utilizing features of the technology described herein. Exemplary features of the technology described herein classify user accounts as an account-type using one or more type-features. Exemplary account-types include a person-type and a company-type. Exemplary type-features utilized to distinguish between the two include, but are not limited to, pronoun usage (e.g., use of "my" is likely associated with a person rather than a company), the presence of a face on the image/profile picture (e.g., a face is likely associated with a person rather than a company), account name (the name may be matched to a person name or company name in a knowledge graph), the presence of a URL (likely associated with a company), and the like. This data may be used to classify the user account database.

Figure 2:
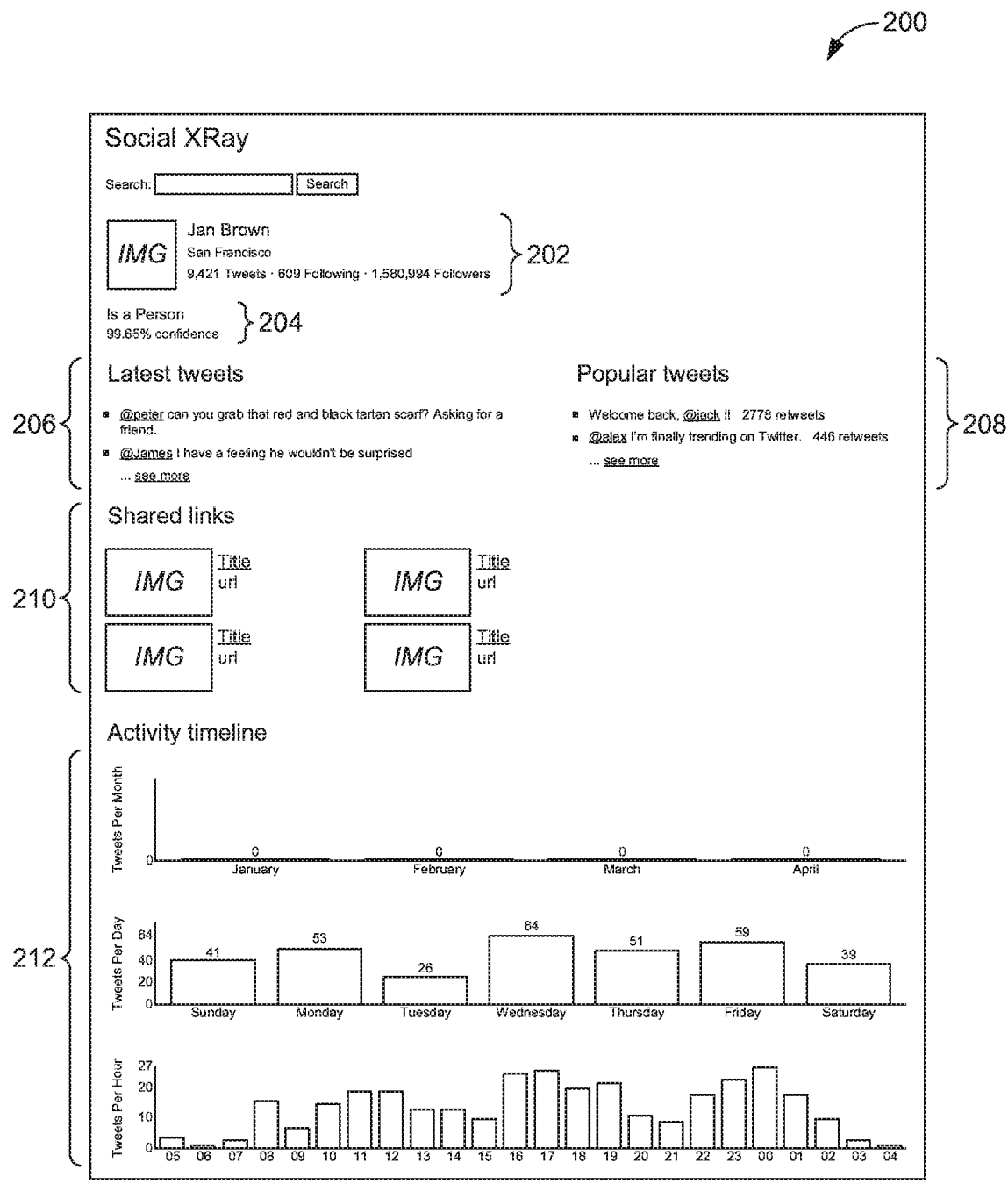
FIG. 2 is an exemplary interface 200 for expert profiling, in accordance with an aspect of the technology described herein.
Figure 3:
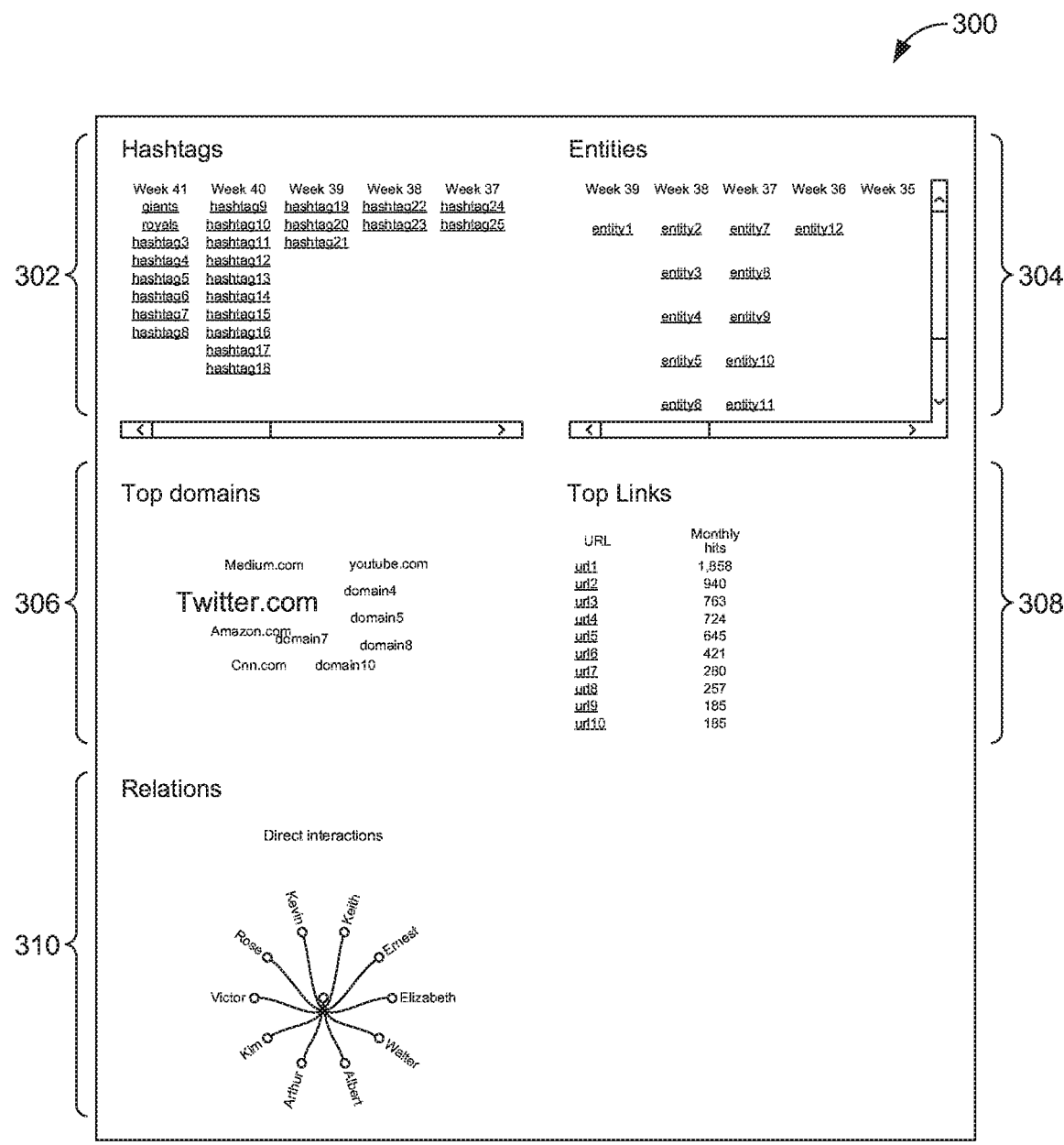
FIG. 3 is an exemplary interface 300 for expert profiling, in accordance with an aspect of the technology described herein.

FIGS. 2 and 3 are exemplary profiles built to be searched by users. In some cases, users may be interested in examining a specific person to retrieve topics of expertise (rather than looking at topics and identifying people therefrom). FIGS. 2 and 3 illustrate an exemplary profile. FIG. 2 provides an exemplary profile interface 200 where a detailed account view is provided. As is shown, a user has been selected to study—shown as user 202. An account-type classifier 204 is provided and, in this instance, illustrates the user is likely a person. A confidence level associated with the account-type classifier 204 may be provided. Categorizing profiles as account-types (e.g., people or companies), as previously described herein, is useful because it allows users to search for and extract expertise based on type (people or companies). A latest post (e.g., shown as tweets in this example) area 206 is provided showing posts according to a period of time. A popular post area 208 is shown and may be identified as popular based on a number of retweets, views, shares, likes, etc. A shared link area 210 is provided illustrating one or more links the user 402 has shared. An activity timeline area 212 is provided illustrating a variety of profile information per time period. For example, activity timeline area 212 shows a tweets per day, tweets per month, and tweets per hour breakdown. This could be relevant to any post and any time period.

FIG. 3 provides a continued exemplary profile interface 300 where a hashtag area 302 is provided (within the scope of Twitter) where one or more hashtags used by the user 202 are presented (e.g., Royals, Giants, etc.). The entities area 304 provides one or more entities relevant to the user 202 (e.g., CNBC, Houston Rockets, etc.). The entities may be extracted from users' posts (e.g., tweets) by a Named Entity Tagger or other similar algorithm. Also provided in the interface 300 is a top domain area 306 and a top links area 308 where the user is associated with domains and top links based on account activity. Also provided is a relations area 310 wherein interactions with other users are displayed. The present technology creates the detailed user profiles to aid in expert detection.

User expertise is then computed on various topics using information in user profiles. In application, to obtain information to compute expertise, a user account associated with a social network (e.g., microblog) is identified. The user account may be monitored for a predetermined period of time (e.g., months, days, etc.) to profile the account. Several features may be used to identify potential experts. Some exemplary features may include a rank by followers (ranking users that post about a particular topic sorted by a number of followers), rank by posts (ranking users by how many posts they have posted on a particular topic), topical signal (estimates how much an author is involved in a topic—how many posts the author posted on a topic versus how many posts in total), mention impact (how many times a user is mentioned together with the topic), and the like. In short, the more a user is mentioned by unique users the better. However, if a user mentions other users, this will negatively influence its mention impact. This prevents conversations from having too much influence on the mention impact metric.

An easy way, but not efficient, to profile a user's expertise is to look at all terms (words, hashtags, mentions, etc.) the user has tweeted about and rank these terms by how frequently they were mentioned. A common technique to reduce the importance of common terms that appear too frequently (e.g., "RT" (retweet)) is to use the term frequency-inverse document frequency statistic (tf-idf).

For expertise ranking, features of textual evidence are first computed and then ranked. Several features may be utilized but those of significant importance are topic score (TS), mention impact (MI), and retweet impact (RI). The features are defined as follows:

$$topicScore = \frac{\text{tweets by person on topic}}{\sqrt{\text{tweets by person}}}$$

$$mentionImpact = \frac{\text{mentions of person on topic}}{\text{mentions of person}}$$

$$retweetImpact = \frac{\text{retweets of person on topic}}{\text{retweets of person}}$$

The first two features, TS and MI, measure how much the user is specialized in the topic of interest. The third feature, RI, measures the influence of the user.

Before the ranking is performed, the features are normalized and aggregated. To normalize the features, a z-score is computed. For instance, if $\mu_{TS}$ is the average of TS and $\sigma_{TS}$ its standard deviation, it is computed:

$$Z_{TS} = \frac{x - \mu_{TS}}{\sigma_{TS}}$$

In practice, the features appear to be log-normally distributed. Therefore, their logarithm is taken to obtain Gaussian distributions. To aggregate the scores, a weighted sum is used.

Returning now to FIG. 1, the offline stage can be decomposed in two steps. First, behavioral data such as a search query log 102 is processed. Using search terms and clicks, a weighted graph is built in which each vertex represents a keyword and each edge represents a semantic association. Then, communities are detected in the graph. Each of the communities describes a topic of expertise, exploitable for query augmentation. During the online stage 108, the actual query augmentation takes place, where the query is matched with a topic of expertise from the database 106 and the corresponding keywords are appended. A detection algorithm is then run to detect experts. Because of the query log, the collection of keywords is inherently current. This is particularly useful when dealing with social media.

Next, a collection of expertise domains is described. During the extraction phase, a graph of semantic relationships is derived from the search query log. During the clustering phase (both extraction and clustering are illustrated in the offline phase of FIG. 1), it is detailed how to decompose the graph into communities using a parallel, modularity-based approach.

A problem encountered in the area of expert detection is that several different keywords can describe the same domain of expertise (e.g., purse and handbag). An improvement of this system is to include categories of related keywords using a collection of categories (a query mapping technique). The query mapping technique involves building groups of related keywords from search engine logs using behavioral data (e.g., click-through data). A distance metric may be applied to every possible pair of queries to build a graph in which the vertices represent terms and edges their similarity. In this graph there is a high chance that queries from the same topic are all interconnected and form a community (densely connected to each other but sparsely connected to the rest of the data). In other words, there are many edges within the community, but very few between the community and the rest of the graph. This can be quantified by counting the number of edges within the community and compare to what would be found if the edges were randomly distributed between the vertices of the graph.

In application, the query mapping consists of two parts:
1. Building a dissimilarity matrix. In sum, a search query log for a predetermined period of time is evaluated, all the links clicked for each query are identified, and a list of common links for each possible pairs of queries is obtained. The links are counted and used to weight the edges in the graph.
2. Parallel modularity optimization. This comprises repeating the following three steps: for each community, get all neighbor communities; list all neighborhoods to which a community belongs and keep the closest one; and take each neighborhood, aggregate everyone into one big new community.

The collection of linked topics of expertise is generated using behavioral data of a search query log of a search engine (e.g., query logs and user clicks). This source provides massive, time-relevant collections of keywords. Semantic associations are inferred between the terms with search and click behavior. The search terms may then be partitioned into communities, that is, groups of strongly related keywords. The groups are then used to enrich the queries. An implementation of modularity maximization is a framework implemented to detect communities in graphs due to the scale of the datasets involved. An advantage to this approach is that it can directly be implemented in (parallel) declarative languages such as Hive, Pig, Microsoft's SCOPE or even SQL.

To build the collection of related topics, a search log of a search engine is utilized. This source is intrinsically current and exhaustive. Semantic relationships between terms are inferred using the URL's clicked for each keyword. This approach allows for detection of non-obvious semantic associations. Consider a vector space where each dimension represents a URL from the query log. In this space, each query is associated to a vector. Each component of the vector represents the number of clicks on the URL. To obtain the similarity between two terms, the cosine distance between the two vectors which represent the terms is computed. If the distance between every possible pair of terms is computed a term similarity graph is obtained. In this weighted, undirected graph, each vertex represents a query and the edges describe their similarity. This graph provides the necessary information for community detection.

In practice, all queries which appear less than a predetermined number of times (e.g., 50) per month are removed to reduce noise and save space. Even after this operation, the same term can appear with dozens, sometimes hundreds, of variants (e.g., san Francisco, #sanfrancisco, sf, . . . ). These queries are left unchanged in order to capture as many different cases as possible.

Once the similarity graph is built, the next step is to create groups of related keywords. Groups of queries that are densely connected to each but loosely connected to the rest of the graph are identified. It is assumed that if a group of keywords obeys such a property, it can be used to expand queries. A customized variant of modularity maximization is utilized for community detection. This approach can be directly implemented in a SQL-like language. Therefore, it can be parallelized with standard map-reduce relational operators. The algorithm is initialized by assigning each vertex to a community. Then, the following three steps are repeated:

1. For each community, list all the neighbor communities. Two communities are neighbors if (a) they are connected and (b) if, when the system unions them, the total modularity increases ($\Delta$ Mod>0). Several neighbors are obtained, one for each community.
2. The neighborhoods found in step 1 are overlapping: one community may belong to several neighborhoods. To remediate this, take each community, list all the neighborhoods to which it belongs and keep the closest one ($\Delta$ Mod is as large as possible).
3. For each neighborhood, aggregate all the communities into one large, new community.

Next, the system retrieves communities for given queries. The approach utilized herein is based on exact match—a community which contains the query terms exactly and in order, after lower-casing, is found. Once the relevant community is identified, expert search is run for all the related terms separately. The system then unions the results and ranks the experts. No other expert detection approaches are based on query expansion.

Once the profiles have been built (as shown in FIGS. 2 and 3) to be searched and behavioral data utilized to improve recall of expertise, interfaces may be generated for users to use to search and browse expertise detection. Exemplary interfaces are provided in FIGS. 4 and 5 and discussed below.

Figure 4:
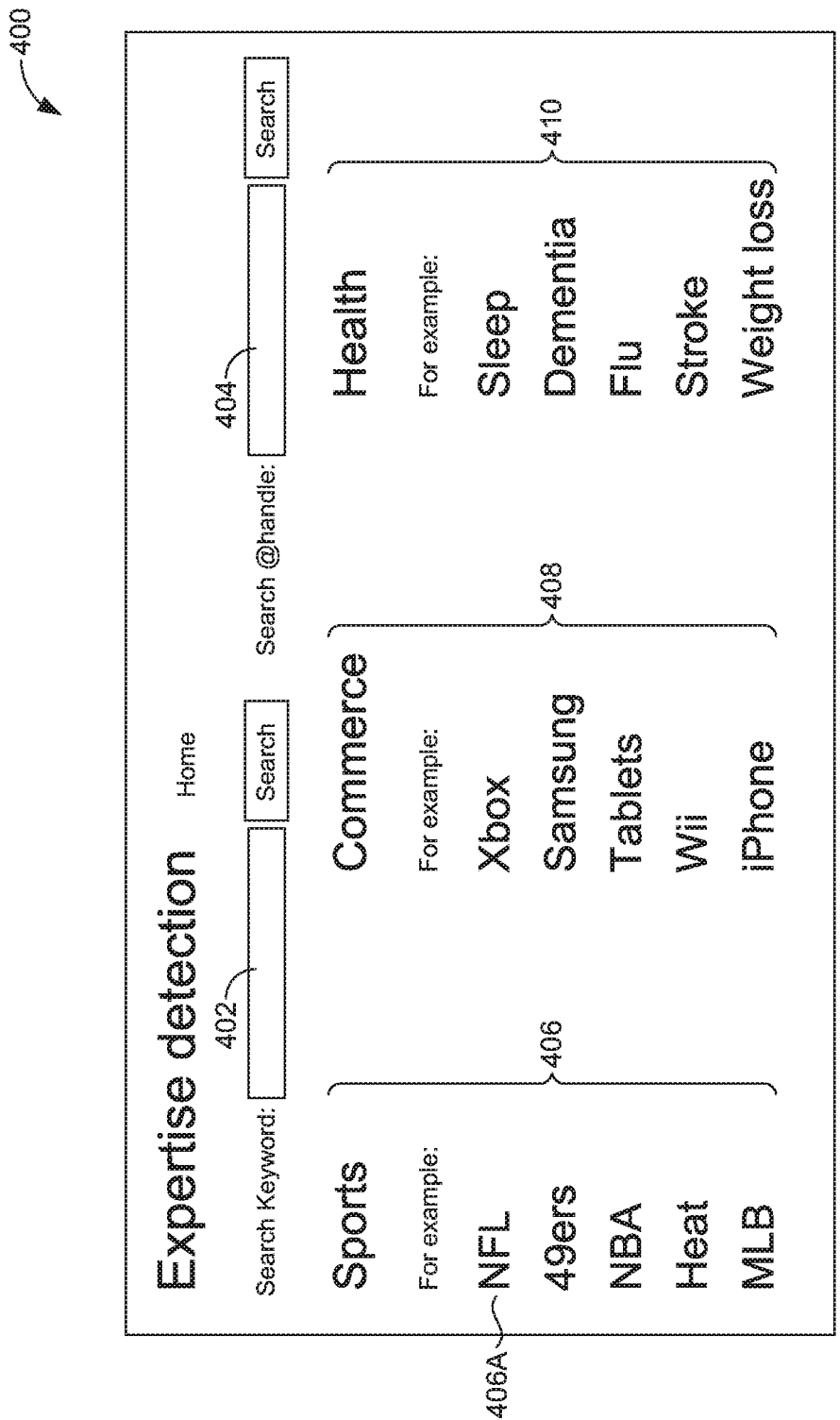
FIG. 4 is an exemplary interface 400 for expert detection, in accordance with an aspect of the technology described herein.
Figure 5:
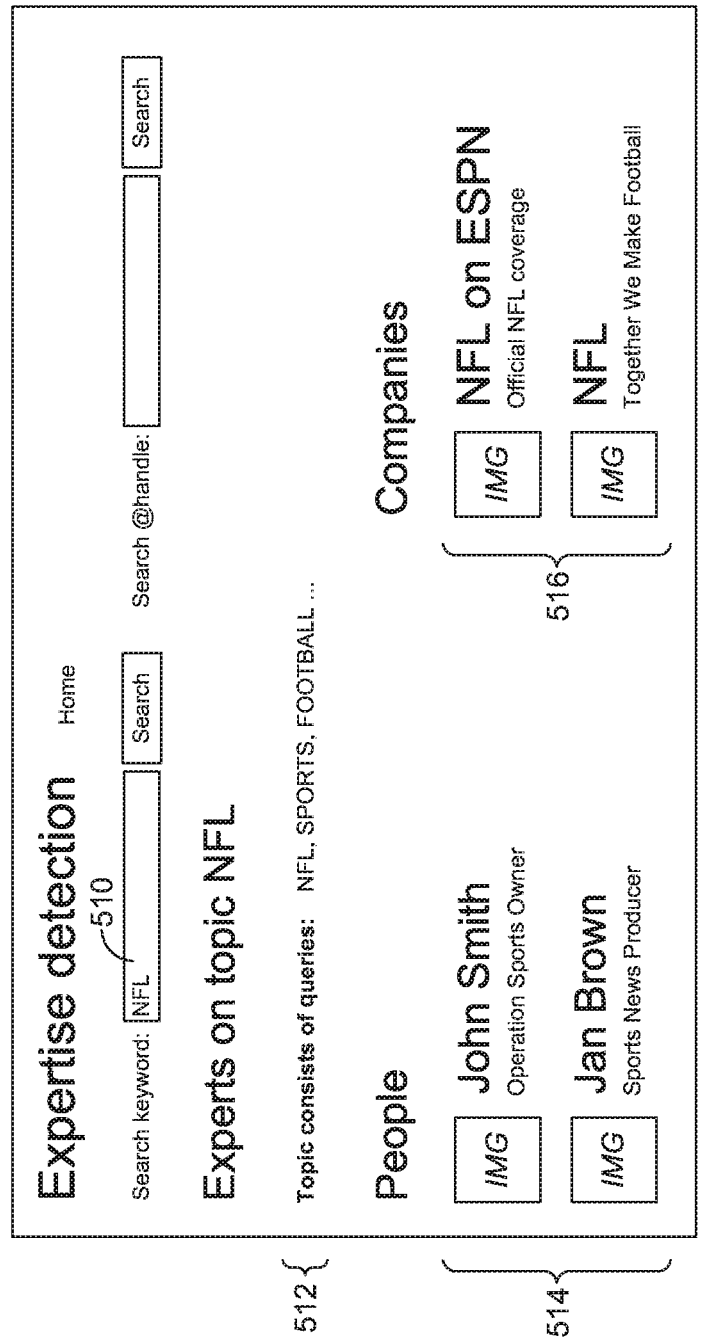
FIG. 5 is an exemplary interface 500 for expert detection, in accordance with an aspect of the technology described herein.

FIG. 4 provides an exemplary user interface 400 for use with the present technology. FIG. 4 illustrates browsing expert topics by segment. For example, in the category sports 406 the main topics are NFL 406A, MLB, etc. This interface 400 allows for a user to search for experts using keyword search inputs 402 or user inputs 404. Additional categories 408 and 410 are also listed for exemplary purposes. Individual topics within the interface may be selectable. For instance, topic 406A is selectable such that, when selected, a ranked list of accounts associated as experts on the selected topic may be presented. The community detection technique is used to describe what keywords (or queries) constitute the topic. This is illustrated in FIG. 5 where the topic 406A of FIG. 4 was selected and an interface 500 of potential experts is provided. As shown, the input 510 is selected and populated in the keyword input area (area 402 in FIG. 4). As shown, people-type experts 514 and company-type experts 516 may be provided. Additionally, area 512 provides one or more queries related to the topic. The exemplary interfaces 400 and 500 shown in FIGS. 4 and 5 may be presented in combination with search engine results.

Figure 6:
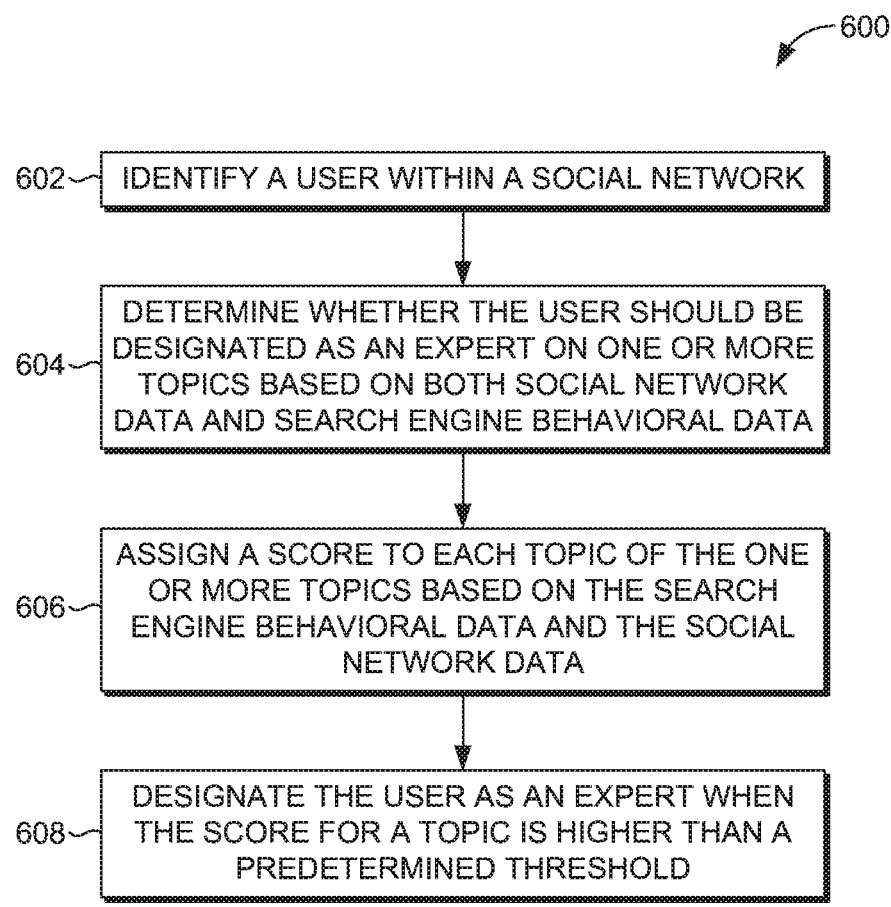
FIG. 6 is a flow chart depicting a first method 600 of expert detection, in accordance with an aspect of the technology described herein.

Turning now to FIG. 6, a method 600 for topical expert detection is provided. In one aspect, method 600 is performed on a client device. In another aspect, method 600 is performed on a server. At step 602, a user is identified within a social network. At step 604, a determination whether the user should be designated as an expert on one or more topics based on both social network data and search engine behavioral data is made. At step 606, a score is assigned to each topic of the one or more topics based on the search engine behavioral data and the social network data. At step 608, the user is designated as an expert when the score for a topic is higher than a predetermined threshold.

Figure 7:
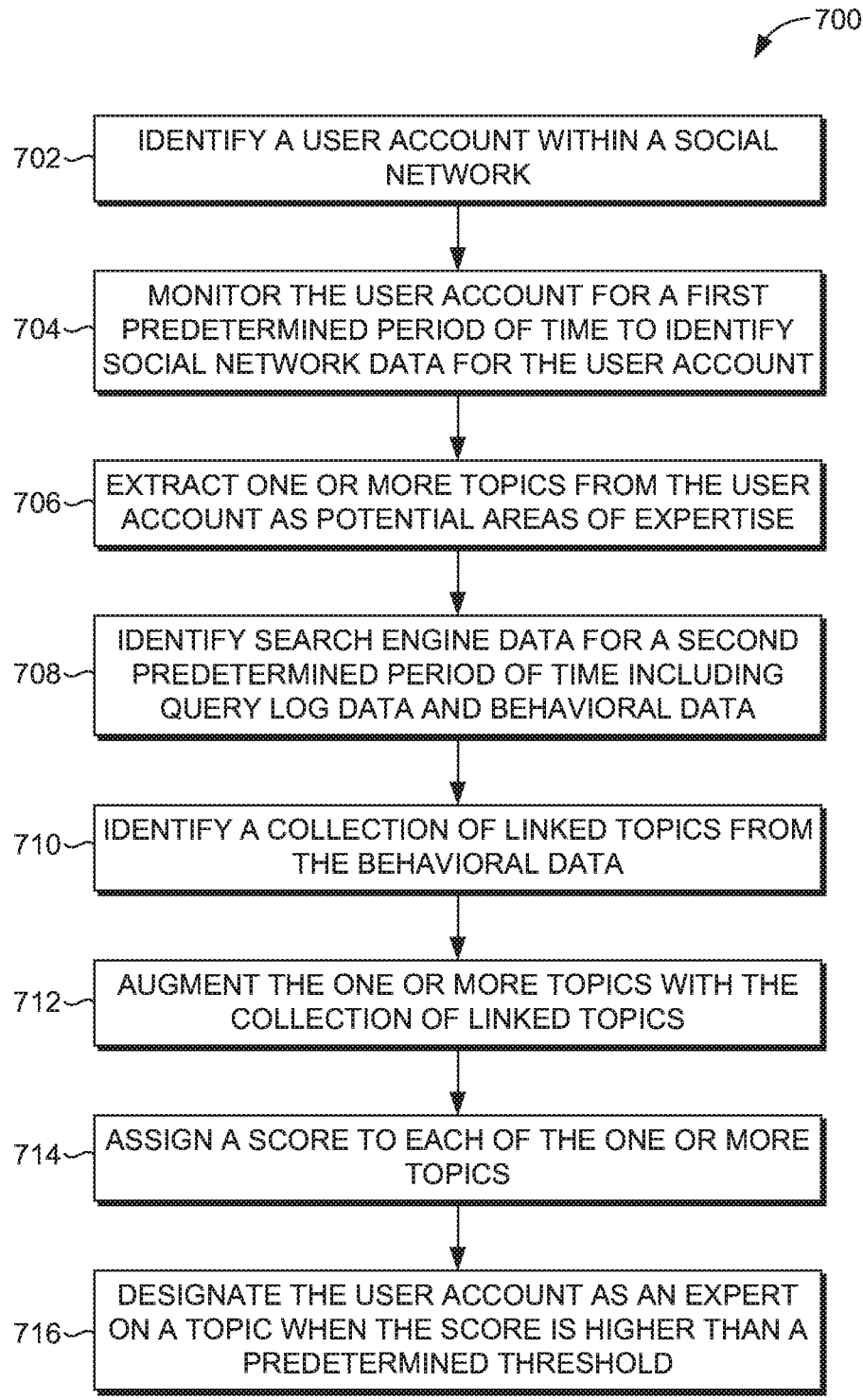
FIG. 7 is a flow chart depicting a second method 700 of expert detection, in accordance with an aspect of the technology described herein.

Turning now to FIG. 7, a method 700 for topical expert detection is provided. At step 702, a user account within a social network is identified. The user account is monitored for a first predetermined period of time to identify social network data for the user account at step 704. At step 706, one or more topics are extracted from the user account upon identifying the one or more topics as potential areas of expertise. A score may be assigned at this point to the one or more topics. At step 708, search engine data for a second predetermined period of time including query log data and behavioral data is identified. At step 710, a collection of linked topics is identified from the query log data and the behavioral data. The linked topics may be indicated as related to the one or more topics upon evaluation of one or more of the behavioral data and the query log data. At step 712, the one or more topics are augmented with the collection of linked topics. At step 714, a score is assigned to each of the one or more topics. At step 716, the user account is designated as an expert on a topic when the score is higher than a predetermined threshold.

As shown herein, the present technology includes three main components: user profiling, expertise detection, and recall improvements to expertise detection using behavioral data via community detection. Initially, profiles are built (as shown in FIGS. 4 and 5) that are then configured to be searched for expertise. Finally, by using the behavioral data (e.g., query logs and clicks), it is possible to improve the recall of the expertise pipeline (i.e., increase the number of experts on topics). Once this is in place, users can search and browse expertise data via expert interfaces, such as FIGS. 4 and 5.

Exemplary Operating Environment

Referring to the drawings in general, and initially to FIG. 8 in particular, an exemplary operating environment for implementing aspects of the technology described herein is shown and designated generally as computing device 800.

Computing device 800 is but one example of a suitable computing environment and is not intended to suggest any limitation as to the scope of use or functionality of the technology described herein. Neither should the computing device 800 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 8, computing device 800 includes a bus 810 that directly or indirectly couples the following devices: memory 812, one or more processors 814, one or more presentation components 816, input/output (I/O) ports 818, I/O components 820, and an illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 8 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 8 and refer to "computer" or "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 812 includes computer storage media in the form of volatile and/or nonvolatile memory. The memory 812 may be removable, non-removable, or a combination thereof. Exemplary memory includes solid-state memory, hard drives, optical-disc drives, etc. Computing device 800 includes one or more processors 814 that read data from various entities such as bus 810, memory 812, or I/O components 820. Presentation component(s) 816 present data indications to a user or other device. Exemplary presentation components 816 include a display device, speaker, printing component, vibrating component, etc. I/O ports 818 allow computing device 800 to be logically coupled to other devices including I/O components 820, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In embodiments, a pen digitizer (not shown) and accompanying input instrument (also not shown but which may include, by way of example only, a pen or a stylus) are provided in order to digitally capture freehand user input. The connection between the pen digitizer and processor(s) 814 may be direct or via a coupling utilizing a serial port, parallel port, and/or other interface and/or system bus known in the art. Furthermore, the digitizer input component may be a component separated from an output component such as a display device, or in some embodiments, the usable input area of a digitizer may be coextensive with the display area of a display device, be integrated with the display device, or may exist as a separate device overlaying or otherwise appended to a display device. Any and all such variations, and any combination thereof, are contemplated to be within the scope of embodiments of the technology described herein.

An NUI processes air gestures, voice, or other physiological inputs generated by a user. Appropriate NUI inputs may be interpreted as ink strokes for presentation in association with the computing device 800. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 800. The computing device 800 may be equipped with depth cameras, such as stereoscopic camera systems, infrared camera systems, RGB camera systems, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

A computing device may include a radio 824. The radio 824 transmits and receives radio communications. The computing device may be a wireless terminal adapted to receive communications and media over various wireless networks. Computing device 800 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

Aspects of the technology described herein have been described to be illustrative rather than restrictive. It will be understood that certain features and subcombinations are of utility and may be employed without reference to other features and subcombinations. This is contemplated by and is within the scope of the claims.

The invention claimed is:

1. A system comprising:
   at least one processor; and
   memory having computer-executable instructions stored thereon which, when executed by the at least one processor, cause the at least one processor to:
   obtain a weighted graph of topics where each vertex of the weighted graph represents a topic keyword and each edge between vertices represents a semantic association, each topic within the weighted graph comprising one or more topic keywords;
   identify a user account for a user within a social network;
   identify, from the weighted graph, a set of topics associated with the user account based on keywords in posts authored by the user account;
   designate the user account as an expert for a particular topic of the set of topics in accordance with a user account score for the topic being higher than a predetermined threshold, wherein the user account score is based on one or more of: rank by followers, rank by posts, topical signal, and mention impact;
   obtain a user query for experts on the particular topic; and
   responsive to the user query, return identification of the user account.

2. The system of claim 1, further comprising obtaining a query log comprising the one or more topic keywords and URL click through data.

3. The system of claim 2, further comprising associating each query of a query log to a vector, each component of the vector representing the URL click through data.

4. The system of claim 3, further comprising determining similarity between topic keywords of the one or more topic keywords based on a cosine distance between two vectors corresponding to the keywords.

5. The system of claim 4, wherein the semantic relationship is a determined similarity.

6. The system of claim 1, further comprising detecting communities in the weighted graph of topics, each community of the communities describing a topic of expertise exploitable for query augmentation.

7. The system of claim 1, further comprising monitoring the user account for a predetermined period of time to identify social network data for the user account.

8. The system of claim 7, further comprising extracting a set of topics from the user account upon identifying the set of topics as potential areas of expertise.

9. The system of claim 8, further comprising monitoring search engine data for a second predetermined period of time to identify query log data and behavioral data of the user account.

10. The system of claim 9, further comprising utilizing the query log data and the behavioral data of the user account, identifying a collection of linked topics.

11. The system of claim 10, further comprising augmenting the set of topics with the collection of linked topics.

12. The system of claim 11, further comprising assigning a score to each of the set of topics for the user account.

13. The system of claim 1, further comprising ranking the user account based on a normalization and aggregation of a topic score, a mention impact, and a retweet impact, wherein the topic score is equal to the posts authored by the user account for the particular topic divided by the square root of the posts authored by the user account, the mention impact is a number of mentions by the user account for the particular topic divided by the number of mentions by the user account, and the retweet impact is a number of retweets of the user account on the particular topic divided by the number of retweets of the user account.

14. The system of claim 1, further comprising creating a profile for the user account comprising shared links, activity timelines, associated topics, named-entities and user relationships of the user account within the social network.

15. A method comprising:
   obtaining a weighted graph of topics where each vertex of the weighted graph represents a topic keyword and each edge between vertices represents a semantic association, each topic within the weighted graph comprising one or more topic keywords;
   identifying a user account for a user within a social network;
   identifying, from the weighted graph, a set of topics associated with the user account based on keywords in posts authored by the user account;
   designating the user account as an expert for a particular topic of the set of topics in accordance with a user account score for the topic being higher than a predetermined threshold, wherein the user account score is based on one or more of: rank by followers, rank by posts, topical signal, and mention impact;
   obtaining a user query for experts on the particular topic; and
   responsive to the user query, returning identification of the user account.

16. The method of claim 15, further comprising ranking the user account based on a normalization and aggregation of a topic score, a mention impact, and a retweet impact.

17. The method of claim 16, wherein the topic score is equal to the posts authored by the user account for the particular topic divided by the square root of the posts authored by the user account.

18. The method of claim 16, wherein the mention impact is a number of mentions by the user account for the particular topic divided by the number of mentions by the user account.

19. The method of claim 16, wherein the retweet impact is a number of retweets of the user account on the particular topic divided by the number of retweets of the user account.

20. One or more computer storage media having computer-executable instructions embodied thereon, that when executed, perform operations, the operations comprising:
- obtaining a weighted graph of topics where each vertex of the weighted graph represents a topic keyword and each edge between vertices represents a semantic association, each topic within the weighted graph comprising one or more topic keywords;
- identifying a user account for a user within a social network;
- identifying, from the weighted graph, a set of topics associated with the user account based on keywords in posts authored by the user account;
- designating the user account as an expert for a particular topic of the set of topics in accordance with a user account score for the topic being higher than a predetermined threshold, wherein the user account score is based on one or more of: rank by followers, rank by posts, topical signal, and mention impact;
- obtaining a user query for experts on the particular topic; and
- responsive to the user query, returning identification of the user account.

* * * * *